United States Patent
Lange (10) Patent No.: US 12,467,544 B2
(45) Date of Patent: Nov. 11, 2025

(54) PINCH VALVE INCLUDING GUIDE ROLLERS

(71) Applicant: AMERICAN STERILIZER COMPANY, Mentor, OH (US)

(72) Inventor: Ethan K. Lange, Painesville, OH (US)

(73) Assignee: American Sterilizer Company, Mentor, OH (US)

( * ) Notice: Subject to any disclaimer, the term of this patent is extended or adjusted under 35 U.S.C. 154(b) by 0 days.

(21) Appl. No.: 18/836,219

(22) PCT Filed: Jan. 9, 2023

(86) PCT No.: PCT/US2023/010378
§ 371 (c)(1),
(2) Date: Aug. 6, 2024

(87) PCT Pub. No.: WO2023/154152
PCT Pub. Date: Aug. 17, 2023

(65) Prior Publication Data
US 2025/0137537 A1     May 1, 2025

Related U.S. Application Data (60) Provisional application No. 63/308,216, filed on Feb. 9, 2022.

(51) Int. Cl.
*F16K 7/04*     (2006.01)
*A61M 39/28*     (2006.01)

(52) U.S. Cl.
CPC ............. *F16K 7/04* (2013.01); *A61M 39/284* (2013.01)

(58) Field of Classification Search
CPC ................................ F16K 7/04; A61M 39/284
(Continued)

(56) References Cited

U.S. PATENT DOCUMENTS

| | | | | |
|---|---|---|---|---|
| 143,907 | A * | 10/1873 | Hyde | F16K 7/06 138/119 |
| 2,212,733 | A * | 8/1940 | Grigsby | F16K 7/061 138/119 |

(Continued)

FOREIGN PATENT DOCUMENTS

| DE | 4237949 A1 | 5/1994 |
|---|---|---|
| JP | H06144538 A | 5/1994 |

OTHER PUBLICATIONS

International Search Report for corresponding International Application No. PCT/US2023/010378, mailed Apr. 4, 2023.

(Continued)

*Primary Examiner* — Umashankar Venkatesan
(74) *Attorney, Agent, or Firm* — Renner, Otto, Boisselle & Sklar, LLP (57) ABSTRACT

A pinch valve includes a housing, first and second pinch bars, an actuator, a first front roller and a first rear roller. The actuator translates the first and second pinch bars relative to one another along a translation axis to pinch a flexible tube extending through an opening of the housing. The first front roller and the first rear roller are spaced from one another in the direction of a longitudinal axis. The first front roller extends transverse the opening and is positioned longitudinally upstream from the first and second pinch bars and the first rear roller extends transverse the opening and is positioned longitudinally downstream from the first and second pinch bars. The housing includes a first wall bordering the opening. A first plane lying tangent to the first front roller and the first rear roller is spaced inward from the first wall of the housing.

20 Claims, 9 Drawing Sheets

(58) Field of Classification Search
USPC .......................................................... 251/7, 6
See application file for complete search history.

(56) References Cited

U.S. PATENT DOCUMENTS

| | | | | | |
|---|---|---|---|---|---|
| 2,841,357 | A | * | 7/1958 | Little | ................ F16K 7/06 251/6 |
| 2,865,591 | A | * | 12/1958 | Holinshead | ......... A61M 39/283 251/8 |
| 3,012,701 | A | * | 12/1961 | Weber | ................ A47J 31/402 251/7 |
| 4,172,580 | A | * | 10/1979 | Raftis | ................ F16K 7/06 251/8 |
| 4,322,054 | A | * | 3/1982 | Campbell | ............... F16K 7/061 251/5 |
| 4,436,277 | A | * | 3/1984 | Robak | ................ F16K 7/06 251/9 |
| 4,467,997 | A | * | 8/1984 | Ziaylek, Jr. | ............... F16K 7/06 16/102 |
| 5,219,146 | A | * | 6/1993 | Thompson | .............. F16K 7/061 74/665 C |
| 5,657,960 | A | * | 8/1997 | Taylor | ................ F16K 7/07 251/7 |
| 6,536,738 | B2 | * | 3/2003 | Inoue | ................ F16K 7/06 251/5 |
| 7,246,786 | B1 | * | 7/2007 | Schmidt | ................ F16K 7/065 251/6 |
| 7,309,055 | B1 | * | 12/2007 | Spiegel | ............ A61M 39/0247 222/102 |
| 11,971,119 | B2 | * | 4/2024 | Miners | ............... F16K 31/1225 |
| 2009/0320879 | A1 | | 12/2009 | Shaffer | |

OTHER PUBLICATIONS

Written Opinion for corresponding International Application No. PCT/US2023/010378, mailed Apr. 4, 2023.

* cited by examiner

PINCH VALVE INCLUDING GUIDE ROLLERS

This application is a national phase of International Application No. PCT/US2023/010378, filed on Jan. 9, 2023, which claims benefit of U.S. Provisional Application No. 63/308,216, filed Feb. 9, 2022.

FIELD OF INVENTION

This application relates generally to a pinch valve for fluid control through a flexible tube and a method of operating such a pinch valve, and more particularly to a pinch valve including guide rollers for guiding the flexible tube and a method of operating such a pinch valve.

BACKGROUND

Pinch valves are used for fluid control in the medical industry, the pharmaceutical industry, the food dispensing industry, among others. One such medical application is a liquid sterilant or high level disinfectant automated endoscope reprocessor (AER). AERs are designed to kill microorganisms in or on reusable endoscopes by exposing their outside surfaces and interior channels to liquid chemical sterilant or high level disinfectant solutions. The pinch valve is used to control fluid flow in the AER tubing system while minimizing the number of wetted components in the sterile fluid pathway.

For some pinch valves such as pass-through tubing type pinch valves, there remain various shortcomings, drawbacks, and disadvantages relative to certain applications. The housings of pass-through tubing type pinch valves include open block style, rigid, and flexible. The open block style housing is able to accommodate a wide range of flexible tube diameters. Conversely, this means the housing also provides little control of flexible tube location within the housing such that the tube may migrate laterally toward a side wall of the housing, possibly resulting in rubbing and wear of the tube. Migration of the flexible tube also creates the potential for inconsistent pinches and/or leaks.

Another type of housing is the rigid housing. By holding the flexible tube in a fixed and centered location, the rigid housing prevents migration of the flexible tube. However, tube compression cycles still result in inward/outward movement, that is longitudinal movement, of the flexible tube such that the tube will wear against the rigid housing. Another downside of the rigid design is that multiple design variants are required for different tube diameters.

The flexible housing holds the flexible tube in a fixed and centered location much like the rigid housing, but because the housing is made of a softer elastomeric material, tube wear due to inward/outward movement is not as prevalent. During flexible tube installation and replacement, however, friction between the elastomeric housing and the flexible tube can present some difficulties feeding the flexible tube through the pinch valve housing.

Accordingly, there remains a need for further contributions in this area of technology.

SUMMARY OF INVENTION

The application relates to a pinch valve including a housing, first and second pinch bars, an actuator, a first front roller and a first rear roller. The actuator translates the first and second pinch bars relative to one another along a translation axis to pinch a flexible tube extending through an opening of the housing. The first front roller and the first rear roller are spaced from one another in the direction of a longitudinal axis. The first front roller extends transverse the opening and is positioned longitudinally upstream from the first and second pinch bars and the first rear roller extends transverse the opening and is positioned longitudinally downstream from the first and second pinch bars. The housing includes a first wall bordering the opening. A first plane lying tangent to the first front roller and the first rear roller is spaced inward from the first wall of the housing.

According to one aspect of the invention, a pinch valve includes a housing including an opening extending therethrough along a longitudinal axis having an upstream end and a downstream end; a first pinch bar and a second pinch bar spaced from one another in a direction perpendicular to the longitudinal axis; an actuator configured to linearly translate the first and second pinch bars relative to one another along a translation axis that is perpendicular to the longitudinal axis to pinch a flexible tube extending through the opening; and a first front roller and a first rear roller spaced from one another in the direction of the longitudinal axis, wherein the first front roller extends transverse the opening and is positioned longitudinally upstream from the first and second pinch bars and the first rear roller extends transverse the opening and is positioned longitudinally downstream from the first and second pinch bars; wherein the housing includes a first wall bordering the opening, and wherein a first plane lying tangent to the first front roller and the first rear roller is spaced inward from the first wall of the housing.

Embodiments of the invention may include one or more of the following additional features separately or in combination.

The first front roller and the first rear roller may be configured to rotate about respectively a first front axis and a first rear axis that are perpendicular to the longitudinal axis.

The first front axis and the first rear axis may be parallel to the translation axis of the first and second pinch bars.

The first and second pinch bars may extend transverse the opening at respective first and second laterally opposite sides of the opening.

The first pinch bar may be a stationary pinch bar and the second pinch bar may be a mobile pinch bar, and the actuator may be configured to translate the mobile pinch bar toward the stationary pinch bar.

The first and second pinch bars may be round shape in axial cross section at least at portions of the first and second pinch bars that face one another.

The first front roller and the first rear roller may be configured to rotate about respective axes that are parallel to the translation axis of the first and second pinch bars.

The pinch valve may include a second front roller and a second rear roller spaced from one another in the direction of the longitudinal axis, and the second front roller may extend transverse the opening and be positioned longitudinally upstream from the first and second pinch bars and the second rear roller may extend transverse the opening and be positioned longitudinally downstream from the first and second pinch bars.

The housing may include a second wall bordering the opening, and a second plane lying tangent to the second front roller and the second rear roller may be spaced inward from the second wall.

The second plane and the first plane may be at laterally opposite sides of the opening.

The second plane may be parallel to the first plane.

The first and second walls may border respective first and second laterally opposite sides of the opening.

The first front roller and the second front roller may be symmetrical about the longitudinal axis and symmetrical about the translation axis, and the first rear roller and the second rear roller may be symmetrical about the longitudinal axis and symmetrical about the translation axis.

The second front roller and the second rear roller may be configured to rotate about respectively a second front axis and a second rear axis that are perpendicular to the longitudinal axis.

The second front axis and the second rear axis may be parallel to the translation axis of the first and second pinch bars.

The first front roller and the second front roller may be at laterally opposite sides of the opening, and the first rear roller and the second rear roller may be at laterally opposite sides of the opening.

The first front roller and the second front roller may be positioned at respective laterally opposite sides of the opening at an equal distance from the center of the opening and the first rear roller and the second rear roller may be positioned at the respective laterally opposite sides of the opening at an equal distance from the center of the opening.

According to another aspect of the invention, a method of guiding a flexible tube in an opening of a pinch valve is provided. The pinch valve includes a housing including an opening extending therethrough and a first wall bordering the opening, a first pinch bar and a second pinch bar spaced from one another, an actuator configured to linearly translate the first and second pinch bars relative to one another, and a first front roller and a first rear roller spaced from one another. The method includes disposing the flexible tube in the opening along a longitudinal axis having an upstream end and a downstream end; linearly translating the first and second pinch bars relative to one another along a translation axis that is perpendicular to the longitudinal axis to pinch the flexible tube extending through the opening; and guiding the flexible tube at a position longitudinally upstream from the first and second pinch bars against the first front roller and longitudinally downstream from the first and second pinch bars against the first rear roller such that the flexible tube is spaced inward from the first wall bordering the opening.

Embodiments of the invention may include one or more of the following additional features separately or in combination.

The housing may include a second wall bordering the opening, and the pinch valve may include a second front roller and a second rear roller spaced from one another, and the method may include guiding the flexible tube at a position longitudinally upstream from the first and second pinch bars against the second front roller and longitudinally downstream from the first and second pinch bars against the second rear roller such that the flexible tube is spaced inward from the second wall bordering the opening.

The pinching of the flexible tube may include outwardly flexing and longitudinally flexing the flexible tube to urge the flexible tube against the first and second front rollers and against the first and second rear rollers.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIGS. 1-14 show a pinch valve 10 in accordance with an embodiment of the invention. The pinch valve 10 includes a housing 14 including an opening 18 extending therethrough along a longitudinal axis X having an upstream end 30 and a downstream end 32. The illustrative housing 14 is a block style type housing having a rectangular shape including left and right opposite side walls 40, 42 and upper and lower opposite side walls 44, 46. In the illustrative embodiment, the left and right side walls 40, 42 border respective left and right laterally opposite sides 50, 52 of the opening 18, and the upper and lower side walls 44, 46 border respective upper and lower laterally opposite sides 54, 56 of the opening 18. A lower pinch bar 60 is mounted within the housing 14 extending between and connected to the left and right opposite side walls 40, 42. An upper pinch bar 70 is movable relative to the lower pinch bar 60 in a direction perpendicular to the longitudinal axis X, or along a translation axis Y. An actuator 80 is mounted to the upper side wall 44 of the housing 14 and is coupled to the upper pinch bar 70. The actuator 80 is configured to linearly translate the upper and lower pinch bars 60, 70 relative to one another along the translation axis Y to pinch a flexible tube 90 extending through the opening 18.

Figure 3:
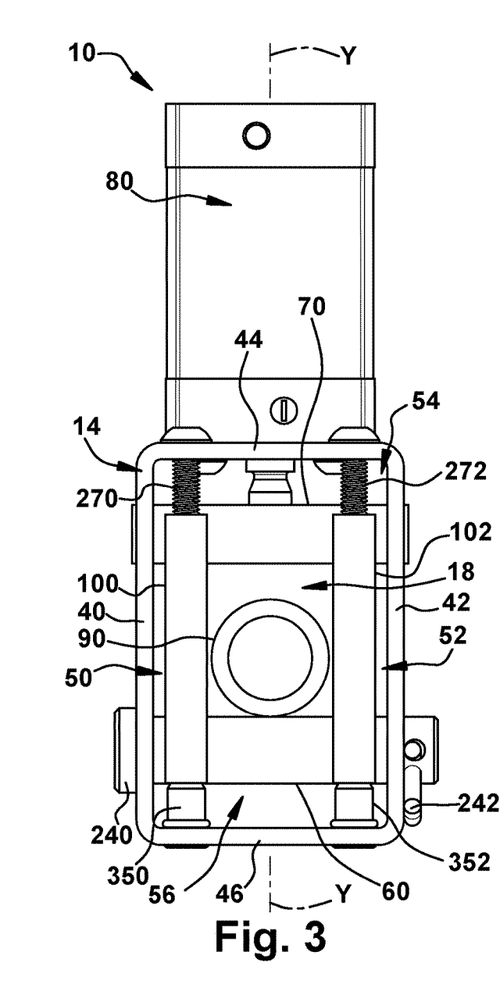
FIG. 3 is a front elevational view of the FIG. 1 pinch valve, showing a flexible tube passing through an opening in the housing with a pair of front guide rollers at laterally opposite sides of the opening and the flexible tube.
Figure 4:
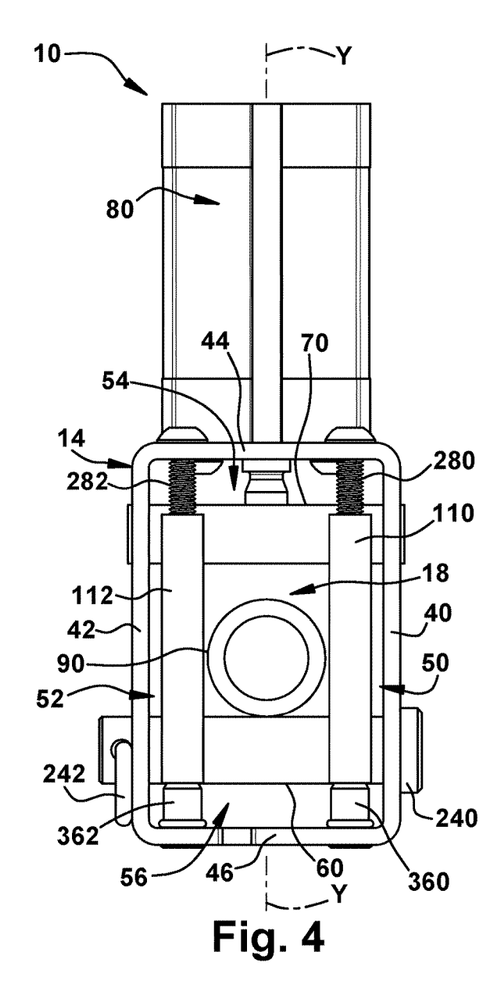
FIG. 4 is a rear elevational view of the FIG. 1 pinch valve, showing the flexible tube passing through the opening in the housing with a pair of rear guide rollers at laterally opposite sides of the opening and the flexible tube.
Figure 5:
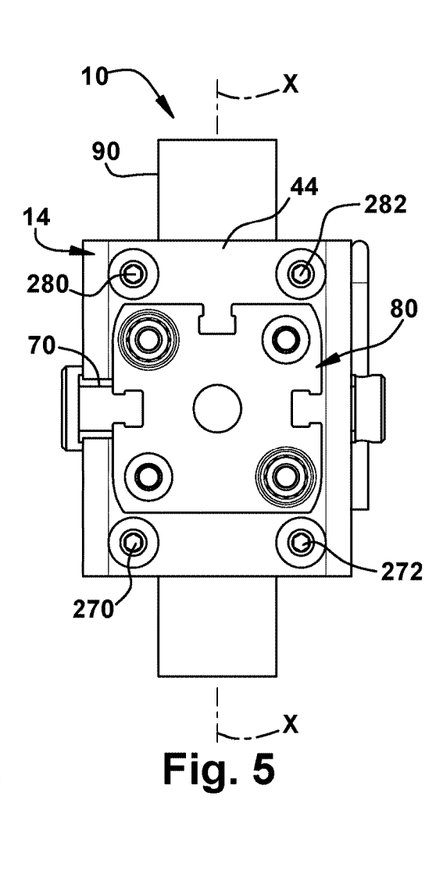
FIG. 5 is a top plan view of the FIG. 1 pinch valve, showing the flexible tube passing through the opening.
Figure 6:
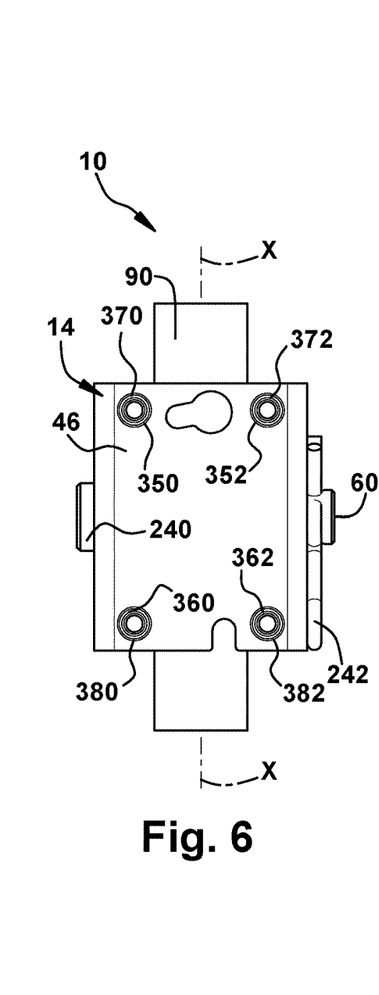
FIG. 6 is a bottom plan view of the FIG. 1 pinch valve, showing the flexible tube passing through the opening.
Figure 7:
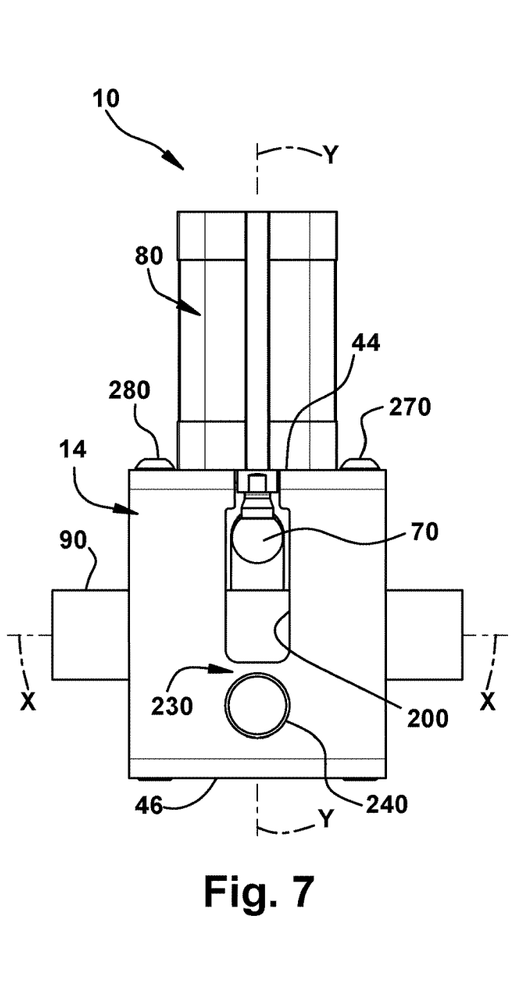
FIG. 7 is a left side elevational view of the FIG. 1 pinch valve, showing the flexible tube passing through the opening.
Figure 8:
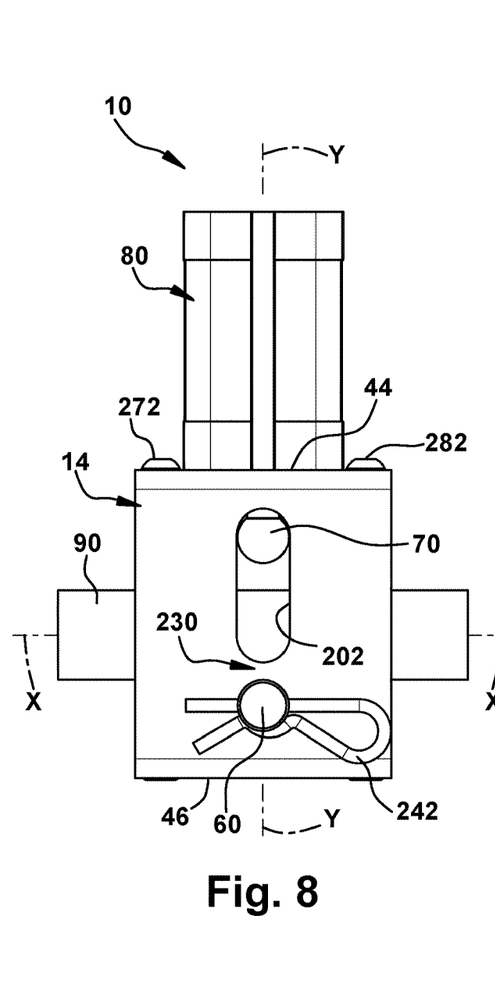
FIG. 8 is a right side elevational view of the FIG. 1 pinch valve, showing the flexible tube passing through the opening.
Figure 11:
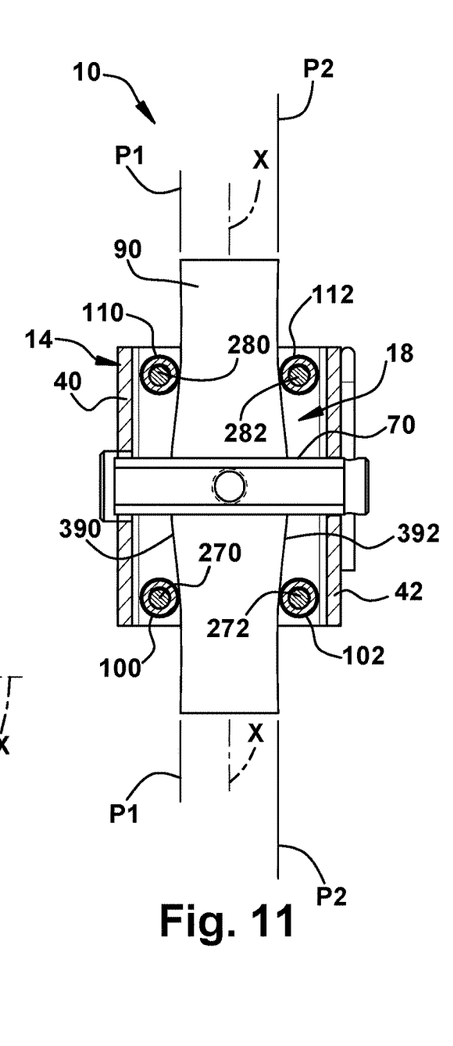
FIG. 11 is a top cross sectional view of the FIG. 1 pinch valve as viewed from the top of the mobile pinch bar, showing the flexible tube passing through the opening and partially pinched between the upper pinch bar and the lower pinch bar.
Figure 14:
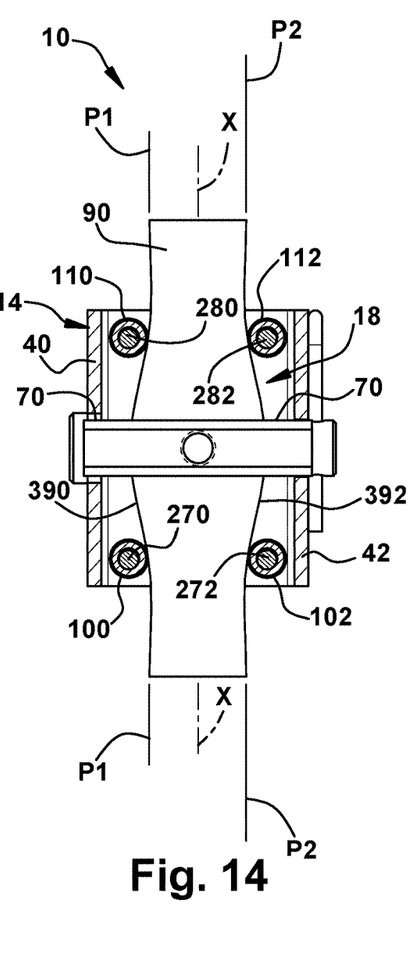
FIG. 14 is a top cross sectional view of the FIG. 1 pinch valve as viewed from the top of the upper pinch bar, showing the flexible tube passing through the opening and fully pinched between the upper pinch bar and the lower pinch bar.

The pinch valve 10 also includes a pair of front rollers 100, 102 and a pair or rear rollers 110, 112 spaced from one another in the direction of the longitudinal axis X. The pair of front rollers 100, 102 are positioned longitudinally upstream from the pinch bars 60, 70 and extend transverse the opening 18 at the respective left and right laterally opposite sides 50, 52 of the opening 18. As shown in FIG. 3, the front rollers 100, 102 are positioned inward from the respective left and right laterally opposite side walls 40, 42 of the housing 14. The pair of rear rollers 110, 112 are positioned longitudinally downstream from the pinch bars 60, 70 and extend transverse the opening 18 at the respective left and right laterally opposite sides 50, 52 of the opening 18. As shown in FIG. 4, the rear rollers 110, 112 are positioned inward from the respective left and right opposite side walls 40, 42 of the housing 14. Referring to FIGS. 11 and 14, it can be seen that a plane P1 lying tangent to the left front roller 100 and the left rear roller 110 is spaced inward from the left side wall 40 of the housing 14 and similarly a plane P2 lying tangent to the right front roller 102 and the right rear roller 112 is spaced inward from the right side wall 42 of the housing 14. As will be described in greater detail below, in some embodiments the right side rollers 102, 112 may be omitted such that the pinch valve 10 has only left side rollers 100, 110, or the left side rollers 100, 110 may be omitted such that the pinch valve 10 has only right side rollers 102, 112. In still other embodiments, the pinch valve 10 may be oriented such that the pinch bars 60, 70 move relative to one another in the left to right and right to left direction and the rollers are in a lower part of the housing 14 with the flexible tube 90 resting on the rollers by gravity.

To install the flexible tube 90 in the pinch valve 10, the flexible tube 90 is fed along the longitudinal axis X from its upstream end 30 to its downstream end 32, that is, between the left and right front rollers 100, 102, between the lower and upper pinch bars 60, 70, and then between the left and right rear rollers 110, 112 at the rear of the pinch valve 10. The flexible tube 90 then rests on the lower pinch bar 60 by gravity. In operation, the actuator 80 is activated to move the upper pinch bar 70 toward the lower pinch bar 60, that is downward in the illustrative embodiment, to compress the flexible tube 90, thereby pinching the flexible tube 90 and stopping fluid flow through the flexible tube 90. To unpinch the flexible tube 90 and thereby resume fluid flow the actuator 80 is deactivated and the upper pinch bar 70 returns to its original or home position. In the illustrative embodiment, the flexible tube 90 returns to its original unpinched state due to the elastomeric properties of the material of the flexible tube 90 and internal fluid pressure in the flexible tube 90.

As will be described in greater detail below, the first and second pairs of rollers 100, 102, 110, 112 provide several advantages both during installation of the flexible tube 90 and during operation of the pinch valve 10. For example, the left side rollers 100, 110 guide and maintain the flexible tube 90 in spaced relation relative to the left side wall 40. In this way, the left side rollers 100, 110 eliminate rubbing or wear of the flexible tube 90 due to contact with the left side wall 40, not only during installation when the flexible tube 90 is fed through the pinch valve 10 but also during operation when the flexible tube 90 migrates laterally and longitudinally during compression between the upper pinch bar 70 and lower pinch bar 60. The right side rollers 102, 112 similarly guide and maintain the flexible tube 90 in spaced relation relative to the right side wall 42. Moreover, where both the left side rollers 100, 110 and the right side rollers 102, 112 are provided, the left side rollers 100, 110 and the right side rollers 102, 112 may additionally serve to center the flexible tube 90 in the housing 14. The rollers 100, 102, 110, 112 also allow for a range of flexible tube sizes to be installed in the pinch valve 10 while still keeping smaller flexible tube sizes spaced away from the housing side walls.

Figure 1:
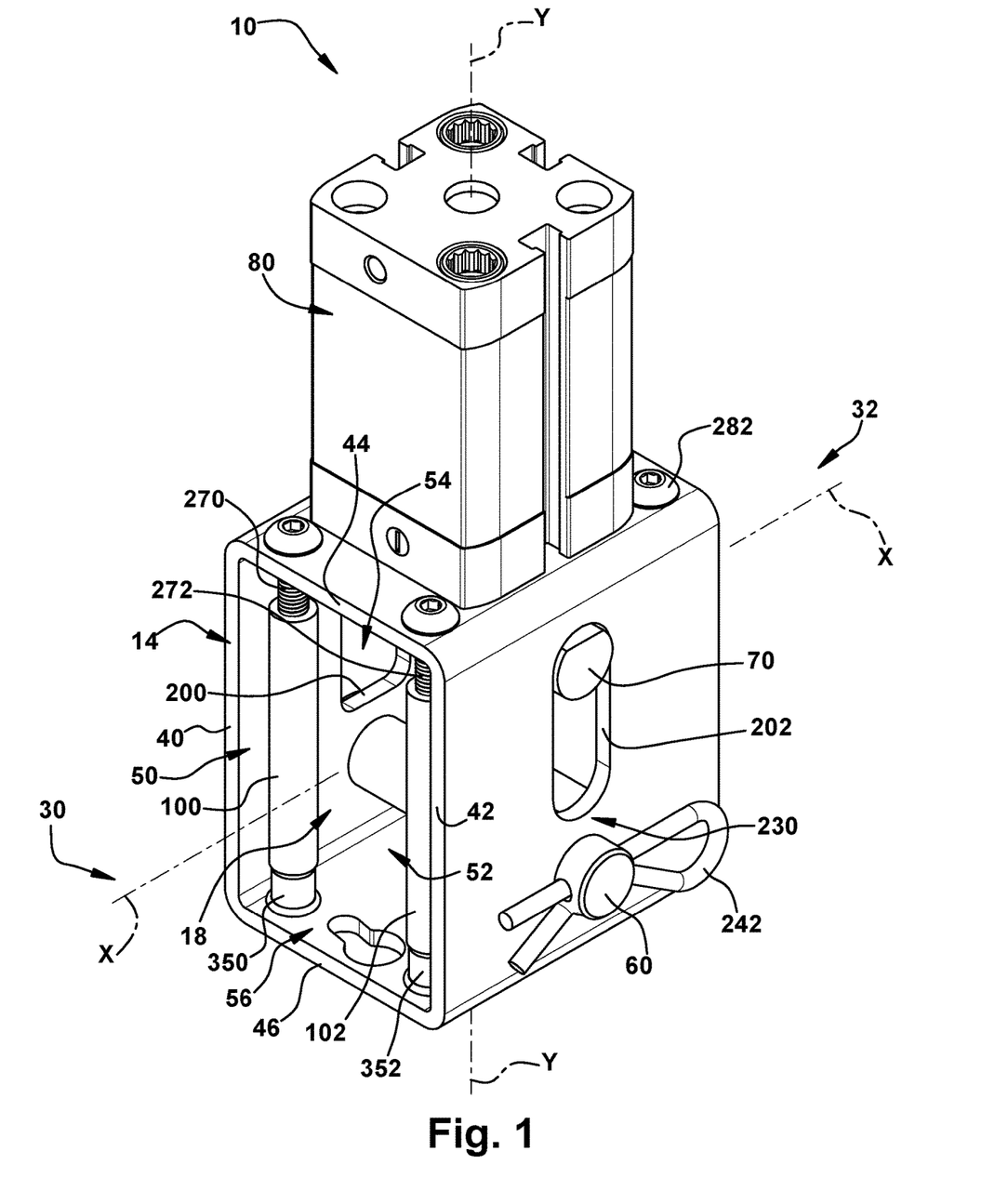
FIG. 1 is a perspective view of a pinch valve according to an embodiment of the invention.
Figure 2:
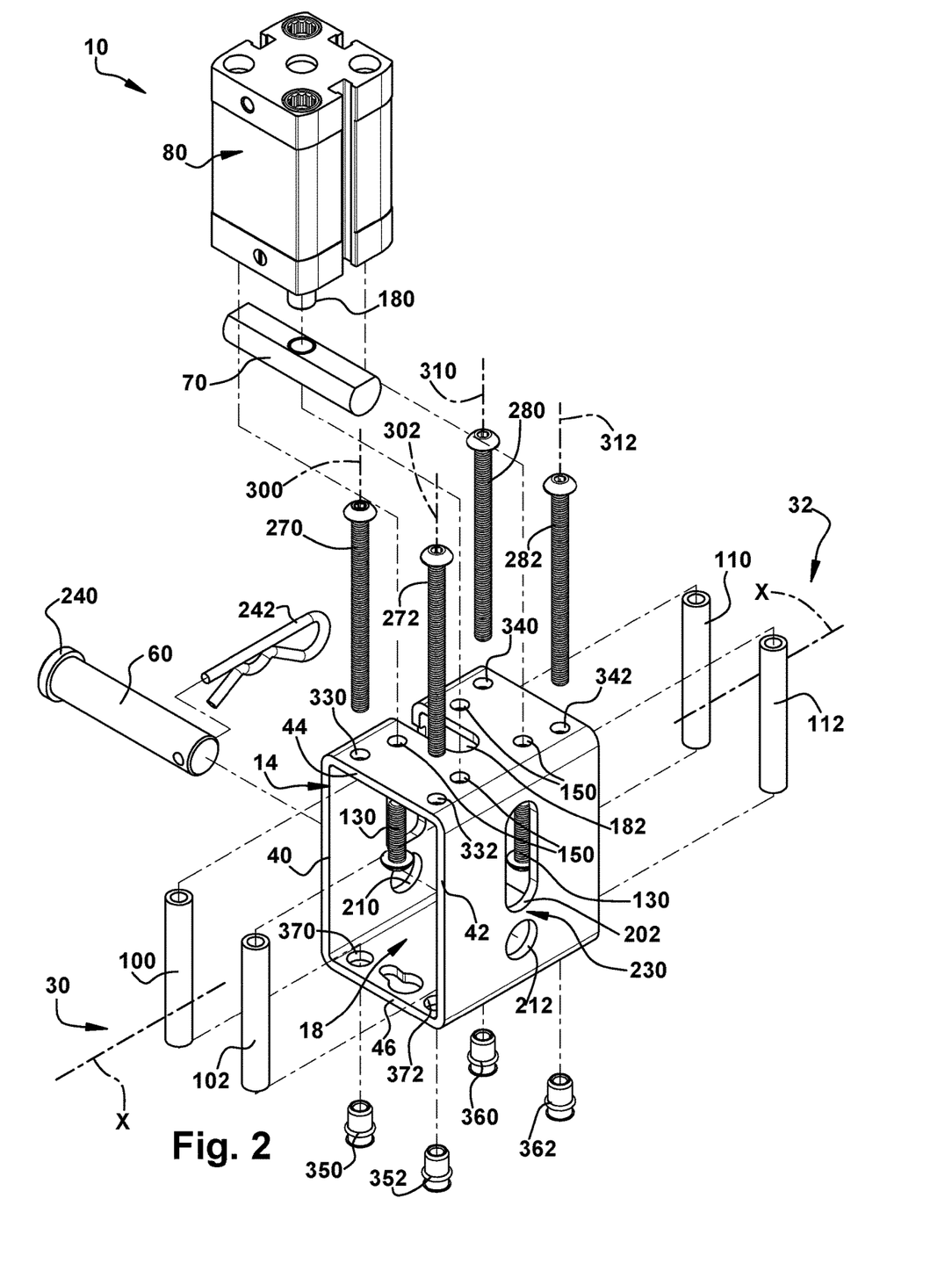
FIG. 2 is an exploded view of the FIG. 1 pinch valve.

Turning initially then to FIGS. 1 and 2, the pinch valve 10 is shown respectively in perspective view and exploded view with the flexible tube 90 omitted for clarity. FIGS. 3-8 show additional views of the pinch valve 10 with the flexible tube 90 extending through the opening 18. In the illustrative embodiment, the housing 14 of the pinch valve 10 is rectangular shape in axial cross section, as is the opening 18 that passes therethrough. Other shapes are contemplated by the invention, for example, circular shape, oval shape, among others. For example, a circular shape housing may have a circular shape opening and may be configured with upper and lower pinch bars that extend transverse the opening and front and rear side rollers that extend transverse the opening and keep the flexible tube spaced from the circular wall that borders the circular opening.

As shown in FIG. 2, the actuator 80 is mounted to the upper side wall 44 of the housing 14 by means of four fasteners 130 (only two in view in FIG. 2) passing through respective four fastener through holes 150 in the upper side wall 44 of the housing 14. The actuator 80 may be driven by any suitable means including pneumatically, electromechanically or hydraulically. An actuator rod 180 of the actuator 80 extends through an opening 182 in the upper side wall 44 of the housing 14. The distal end of the actuator rod 180 is connected to the upper pinch bar 70, in the illustrative embodiment at right angles thereto. The opposite ends of the upper pinch bar 70 are positioned in vertical slots 200, 202 in the left and right side walls 40, 42 of the housing 14. The vertical slots 200, 202 extend along the vertical axis Y, which is perpendicular to the longitudinal axis X of the opening 18. The lower pinch bar 60 is mounted at its opposite ends in through holes 210, 212 (FIG. 2) in the left and right side walls 40, 42 of the housing 14.

In operation, the actuator rod 180 linearly translates the upper pinch bar 70 along the vertical axis Y linearly toward the lower pinch bar 60 aided by the vertical slots 200, 202 linearly guiding the opposite ends of the upper pinch bar 70. To limit the resulting pinch force on the flexible tube 90, the housing 14 incorporates a fixed-displacement mechanical stop 230, which is best shown in FIGS. 1 and 2, and in FIG. 13 where the flexible tube 90 is fully pinched. The mechanical stop 230 is the portion of the left and right side walls 40, 42 of the housing 14 between the bottoms of the slots 200, 202 that guide the upper pinch bar 70 and the tops of the through holes 210, 212 that rotatably support the lower pinch bar 60; in other words, the lower limit of the upper pinch bar 70 and the upper limit of the lower pinch bar 60. The height of the mechanical stop 230 is selected based on a range of wall thicknesses of flexible tubes that are desired to cooperate with the pinch valve 10 to control fluid flow. The mechanical stop 230 aids in allowing the pinch valve 10 to accommodate various flexible tube sizes while being insensitive to actuator force, for example, by pneumatic supply pressure or hydraulic supply pressure. In an embodiment, the mechanical stop 230 may be configured for flexible tubes having a ⅛ inch wall thickness and an inner diameter between 3/16 inch and ½ inch. Thus, the flexible tube may have a ⅜ inch inner diameter and ⅝ inch outer diameter, for example, or a ½ inch inner diameter and ¾ inch outer diameter, for example.

In the illustrated embodiment, the upper pinch bar 70 is mobile and the lower pinch bar 60 is stationary, and the actuator 80 is configured to translate the upper pinch bar 70 toward the lower pinch bar 60. As will be appreciated, in some embodiments, the lower pinch bar 60 may be mobile and the upper pinch bar 70 may be stationary. In still other embodiments, both the upper pinch bar 70 and the lower pinch bar 60 may be mobile, for example, with each being movable by means of a respective actuator or being movable together by a single actuator mechanically coupled to both the upper pinch bar 70 and the lower pinch bar 60. Other embodiments are also contemplated, it being understood that at least one actuator 80 is configured to linearly translate first and second pinch bars 60, 70 relative to one another along the translation axis Y to pinch the flexible tube 90 extending through the opening 18 of the housing 14.

As shown in FIGS. 1 and 2, the pinch bars 60, 70 in the exemplary embodiment are round shape in axial cross section at least at portions of the pinch bars 60, 70 that face one another, that is, facing toward the flexible tube 90. Round or circular geometries are believed to be optimal for limiting the amount of minimum required pinch force, maintaining a sufficient pinch on the flexible tube 90, and maximizing the flexible tube 90 life by limiting the strain on the flexible tube 90. It will be appreciated that the pinch bars 60, 70 may be other than round shape in axial cross section. For example, the pinch bars 60, 70 may be rectangular shape in axial cross section. Generally, using a flat rectangular cross section or increasing the radius of a round cross section will increase the pinch force at a given compression. In some embodiments, the lower pinch bar 60 may have a different cross section shape and/or size than that of the upper pinch bar 70.

In the illustrative embodiment, the lower pinch bar 60 is rotatably supported at its opposite ends in the respective through holes 210, 212 in the left and right opposite side walls 40, 42 of the housing 14, and retained axially relative to the opposite side walls 40, 42 by a lower pinch bar head 240 at one end and a cotter pin 242 at the other end. Mounted in this way, the lower pinch bar 60 is rotatable within the through holes 210, 212, which the inventor has also found to aid in easing strain on the flexible tube 90 during compression.

The flexible tube 90 is made of a silicone rubber, preferably having a 50 A durometer hardness and non-reinforced. A 70 A durometer silicone rubber tubing or a Tygon® tubing are also suitable. In some embodiments, the flexible tube 90 may be transparent or semi-transparent. In some embodiments, reinforced tubing may be used, for example, if non-reinforced tubing is unsatisfactory for the pressure and/or temperature requirements of a particular application. The reinforced tubing may include polyester braided tubing or steel wire tubing, for example. As will be appreciated, additional pinch force may be required for reinforced tubing.

The rollers 100, 102, 110, 112 are coupled to the housing 14 to provide the afore mentioned guidance through the opening 18 of the housing 14 and the afore mentioned spacing relative to the housing walls 40, 42. In the illustrative embodiment, the rollers 100, 102, 110, 112 are in the form of hollow tubes and are mounted over respective threaded fasteners 270, 272, 280, 282 which act as shafts for the rollers 100, 102, 110, 112. Thus, the center axes 300, 302, 310, 312 of the fasteners 270, 272, 280, 282 define the respective center axes about which the respective rollers 100, 102, 110, 112 rotate. The fasteners 270, 272, 280, 282, in turn, pass through respective through holes 330, 332, 340, 342 in the upper side wall 44 of the housing 14 and are held in place by respective nuts 350, 352, 360, 362 secured in four respective through holes 370, 372, 380, 382 (FIG. 6) in the lower side wall 46 of the housing 14. As will be appreciated, the rollers 100, 102, 110, 112 may be supported by means other than threaded fasteners 270, 272, 280, 282 or may be configured in an alternative manner. For example, the rollers 100, 102, 110, 112 may be rotatably mounted to non-threaded rods secured at their opposite ends to the upper and lower side walls 44, 46 of the housing 14 for example by welding. In an alternative configuration, the rollers 100, 102, 110, 112 may be configured as rods rotatably supported at their opposite ends by needle bearings, for example.

Referring to FIG. 2, the left front axis 300 and the left rear axis 310 are perpendicular to the longitudinal axis X. As such, the aforementioned plane P1 that lies tangent to the left front roller 100 and the left rear roller 110 likewise is perpendicular to the longitudinal axis X, as shown in FIGS. 11 and 14. Similarly, the right front axis 302 and the right rear axis 312 are perpendicular to the longitudinal axis X. As such, the aforementioned plane P2 that lies tangent to the right front roller 102 and the right rear roller 112 likewise is perpendicular to the longitudinal axis X, as shown in FIGS. 11 and 14. In the illustrative embodiment, the planes P1 and P2 are parallel to one another owing to the left side rollers 100, 110 and right side rollers 102, 112 being symmetrically arranged about the axis X and axis Y. Of course, in embodiments where the left side rollers 100, 110 and right side rollers 102, 112 are arranged, for example, in a nonsymmetrical manner about the axis X and the axis Y, the planes P1, P2 may be nonparallel to one another.

As will be appreciated, during installation of a flexible tube 90 through the opening 18, the left side rollers 100, 110 will guide the flexible tube 90 along the left side tangential plane P1 and thus along the longitudinal axis X of the opening 18. Similarly, the right side rollers 102, 112 will guide the flexible tube 90 along the right side tangential plane P2 and thus along the longitudinal axis X of the opening 18. Once the flexible tube 90 is installed, as earlier noted, during compression of the flexible tube 90, the left side rollers 100, 110 will keep the flexible tube 90 spaced from the left side wall 40 of the housing 14 and the right side rollers 102, 112 will keep the flexible tube 90 spaced from the right side wall 42 of the housing 14. In this way, the rollers 100, 102, 110, 112 prevent the flexible tube 90 from contacting the walls 40, 42 of the housing 14, thereby preventing abrasion of the flexible tube 90 or at least significantly reducing abrasion compared to contact with a housing side wall.

In the illustrative embodiment, the left front axis 300 and the left rear axis 310 are also parallel to the translation axis Y of the lower and upper pinch bars 60, 70. Similarly, the right front axis 302 and the right rear axis 312 are parallel to the translation axis Y of the lower and upper pinch bars 60, 70. With such arrangement, as shown in FIG. 3, the left front roller 100 and the right front roller 102 are at the respective left and right laterally opposite sides 50, 52 of the opening 18 and as shown in FIG. 4, the left rear roller 110 and the right rear roller 112 are at the respective left and right laterally opposite sides 50, 52 of the opening 18. This enables the upstream front pair of rollers 100, 102 and the downstream rear pair of rollers 110, 112 to guide the flexible tube 90 within the opening 18 of the housing 14 from laterally opposite sides 390, 392 of the flexible tube 90 during operation of the pinch valve 10.

Figure 9:
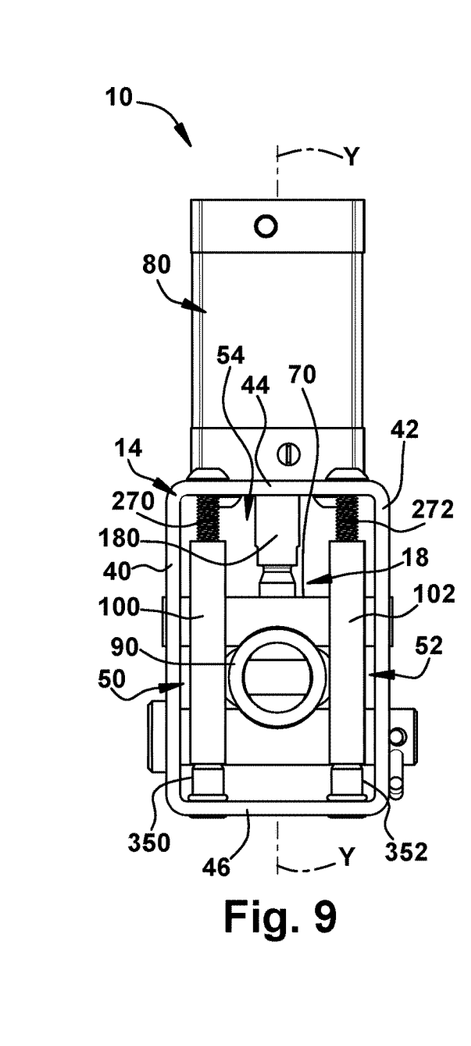
FIG. 9 is a front elevational view of the FIG. 1 pinch valve, showing the flexible tube passing through the opening and partially pinched between an upper pinch bar and a lower pinch bar.
Figure 10:
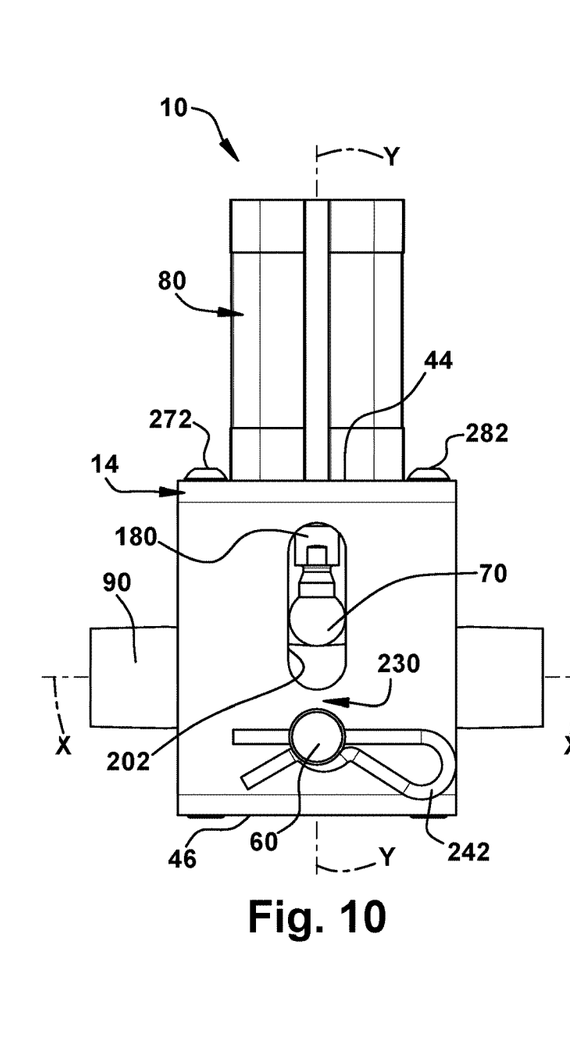
FIG. 10 is a right side elevational view of the FIG. 1 pinch valve, showing the flexible tube passing through the opening and partially pinched between the upper pinch bar and the lower pinch bar.
Figure 12:
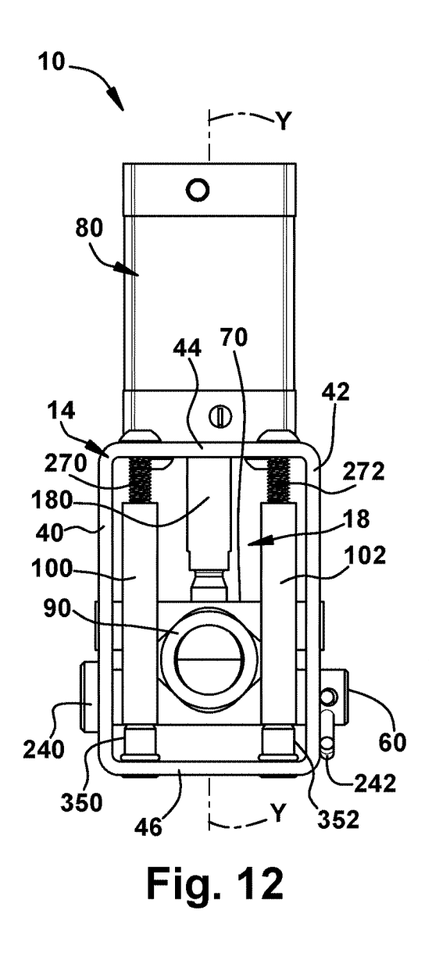
FIG. 12 is a front elevational view of the FIG. 1 pinch valve, showing the flexible tube passing through the opening and fully pinched between the upper pinch bar and the lower pinch bar.
Figure 13:
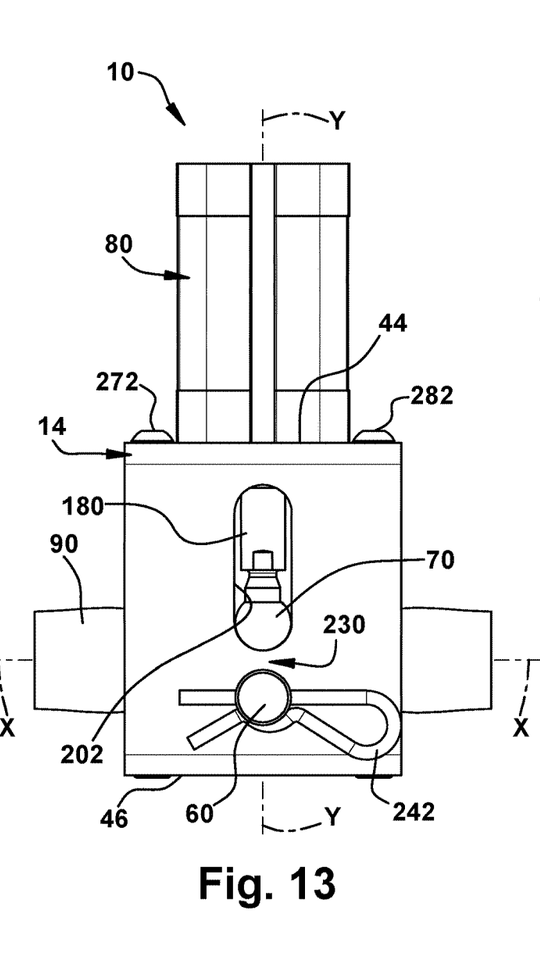
FIG. 13 is a right side elevational view of the FIG. 1 pinch valve, showing the flexible tube passing through the opening and fully pinched between the upper pinch bar and the lower pinch bar.

FIGS. 9-14 illustrate an example of the rollers 100, 102, 110, 112 functioning to provide such guidance of the flexible tube 90. Specifically, FIGS. 9-11 show the flexible tube 90 in a partially compressed state and FIGS. 12-14 show the flexible tube 90 in a fully compressed state. During operation of the pinch valve 10, as the actuator 80 moves the upper pinch bar 70 toward the lower pinch bar 60 to compress the flexible tube 90, the flexible tube 90 migrates laterally or left to right and right to left in FIGS. 9, 11, 12, and 14, and longitudinally or left to right and right to left in FIGS. 10 and 13. The flexible tube 90 may migrate laterally in that the width of the flexible tube 90 flexibly expands laterally outward as the flexible tube 90 is compressed and also by sliding laterally as the flexible tube 90 follows the path of least friction between the pinch bars 60, 70. The flexible tube 90 may migrate longitudinally in that as the flexible tube 90 is compressed between the pinch bars 60, 70 the flexible tube 90 will contract longitudinally toward the pinch bars 60, 70, that is toward the compression location.

In the illustrative embodiment, as shown in FIGS. 11 and 14, as the flexible tube 90 is compressed by the pinch bars 60, 70, the laterally opposite sides 390, 392 of the flexible tube 90 gradually flex outward in the region between the pair of front rollers 100, 102 and the pair of rear rollers 110, 112 as the flexible tube 90 simultaneously gradually contracts in the longitudinal direction toward the compression location. The outward flexing and longitudinal flexing of the flexible tube 90 urges the flexible tube 90 against the front pair of rollers 100, 102 and the rear pair of rollers 110, 112 located at laterally opposite sides 390, 392 of the flexible tube 90. As the flexible tube 90 migrates laterally and longitudinally for example from the position shown in FIG. 11 to the position shown in FIG. 14, the contact between the flexible tube 90 and the rollers 100, 102, 110, 112 causes the rollers 100, 102, 110, 112 to rotate about their respective axes 300, 302, 310, 312. The rollers 100, 102, 110, 112 thus prevent abrasion in the flexible tube 90 or at least significantly reduce the amount of abrasion compared to contact with a housing side wall.

Referring again to FIGS. 3 and 4, it can be seen that the front pair of rollers 100, 102 are positioned at the respective left and right laterally opposite sides 50, 52 of the opening 18 at an equal distance from the center of the opening 18 and the rear pair of rollers 110, 112 are positioned at the respective left and right laterally opposite sides 50, 52 of the opening 18 at an equal distance from the center of the opening 18. For a flexible tube 90 that has a diameter approximately equal to the width between the left side rollers 100, 110 and the right side rollers 102, 112, the rollers 100, 102, 110, 112 additionally function to center the flexible tube 90 in the housing 14 of the pinch valve 10. This is illustrated for example by a comparison of FIG. 3 where the flexible tube 90 is in an uncompressed state, FIG. 9 where the flexible tube 90 is in a partially compressed state, and FIG. 12 where the flexible tube 90 is in a fully compressed state. As shown in FIGS. 9 and 12, in both the partially compressed state and the fully compressed state, the front pair of rollers 100, 102 maintain the flexible tube 90 centered between the rollers 100, 102 and thus centered within the opening 18. The rear pair of rollers 110, 112 function in a similar manner.

Figure 15:
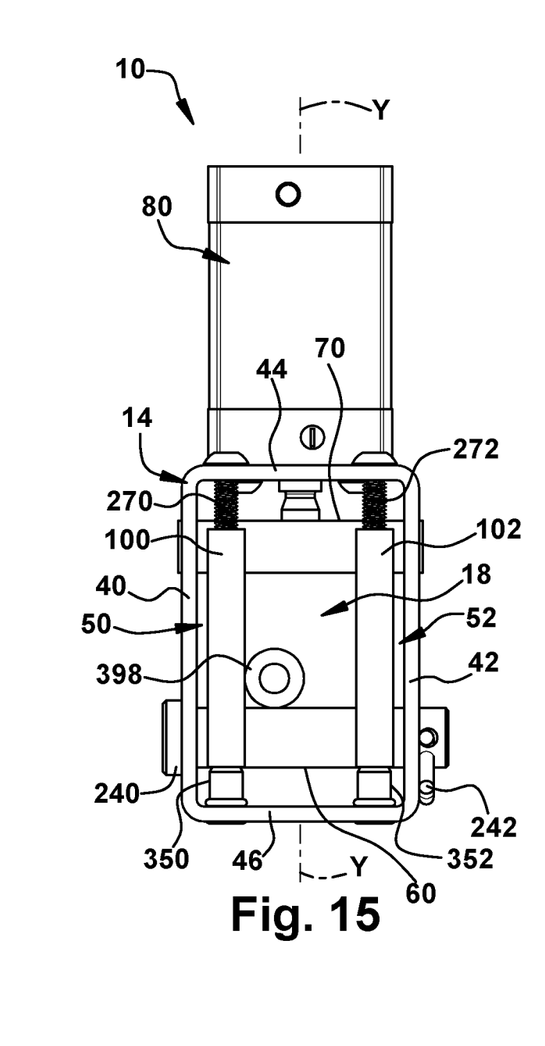
FIG. 15 is a front elevational view of the FIG. 1 pinch valve, showing a flexible tube passing through the opening in the housing with guide rollers at laterally opposite sides of the opening and the flexible tube, where the flexible tube has a smaller diameter than the flexible tube shown in FIG. 3.

Turning now to FIG. 15, as noted above, the rollers 100, 102, 110, 112 may also enable the pinch valve 10 to accommodate a range of flexible tube sizes while still keeping smaller flexible tube sizes spaced away from the side walls 40, 42 of the housing 14. As shown in FIG. 15, a flexible tube 398 having a smaller size diameter (smaller relative to FIG. 3) is guided and supported by the left side rollers 100, 110 of the pinch valve 10. The left side rollers 100, 110 guide and maintain the flexible tube 398 in spaced relation relative to the left side wall 40 of the housing 14. In this way, the left side rollers 100, 110 eliminate rubbing or wear of the flexible tube 398 due to contact with the left side wall 40, not only during installation when the flexible tube 398 is fed through the pinch valve 10 but also during operation when the flexible tube 398 migrates laterally and longitudinally during compression between the upper pinch bar 70 and lower pinch bar 60. As will be appreciated, a similar effect is realized where the flexible tube 398 having the smaller size diameter is guided and supported by the right side rollers 102, 112 of the pinch valve 10; that is, the right side rollers 102, 112 guide and maintain the flexible tube 398 in spaced relation relative to the right side wall 42 of the housing 14. In this way, the right side rollers 102, 111 eliminate rubbing or wear of the flexible tube 398 due to contact with the right side wall 42, not only during installation when the flexible tube 398 is fed through the pinch valve 10 but also during operation when the flexible tube 398 migrates laterally and longitudinally during compression between the upper pinch bar 70 and lower pinch bar 60.

Figure 16:
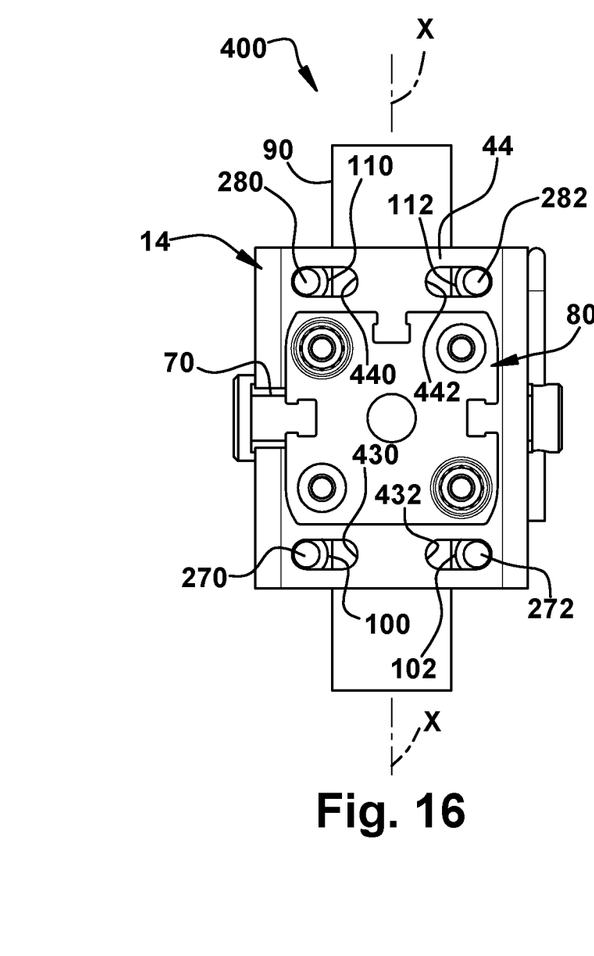
FIG. 16 is a top plan view of a pinch valve according to another embodiment of the invention, similar to the FIG. 1 pinch valve except with slots instead of through holes and omitting fastener heads to view same.

FIG. 16 shows a pinch valve 400 according to another embodiment of the invention. The pinch valve 400 is in many respects similar to the above-referenced pinch valve 10, and consequently the same reference numerals are used to denote structures corresponding to similar structures in the pinch valve 10. In addition, the foregoing description of the pinch valve 10 is equally applicable to the pinch valve 400 except as noted below. Moreover, it will be appreciated upon reading and understanding the specification that aspects of the pinch valves 10, 400 may be substituted for one another or used in conjunction with one another where applicable.

In FIG. 16 pinch valve 400, the upper side wall 44 of the housing 14 is configured with slots 430, 432, 440, 442 instead of through holes and lower side wall 46 of the housing 14 is configured with slots (obstructed from view in FIG. 16) instead of through holes. The fasteners 270, 272, 280, 282 are configured such that their opposite ends slide within the respective upper slots 430, 432, 440, 442 and lower slots. As such, with the rollers 100, 102, 110, 112 rotatably mounted to the fasteners 270, 272, 280, 282, the front left slots and the front right slots enable the width between the front rollers 100, 102 to be adjusted and the rear left slots and the rear right slots enable the width between the rear rollers 110, 112 to be adjusted. For example, the width between the left side rollers 100, 110 and right side rollers 102, 112 can be increased or decreased to substantially conform to the diameter of a flexible tube extending through the opening 18 in the housing 14. Once adjusted, the fasteners 270, 272, 280, 282 may be secured in place in a manner similar to that described above.

Figure 17:
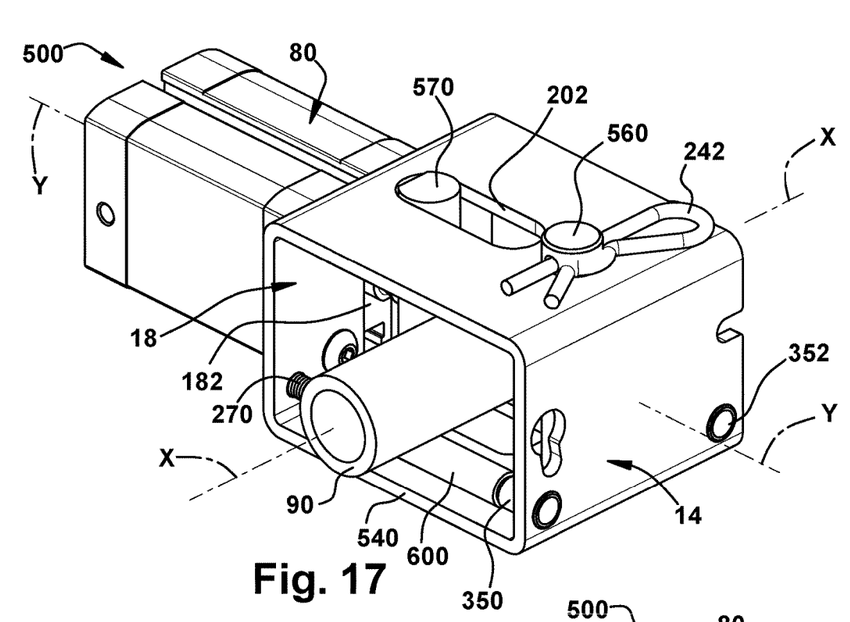
FIG. 17 is a perspective view of a pinch valve according to another embodiment of the invention, similar to the FIG. 1 pinch valve except rotated 90 degrees about the longitudinal axis and showing a flexible tube passing through the opening resting on guide rollers at a lower side of the flexible tube.
Figure 18:
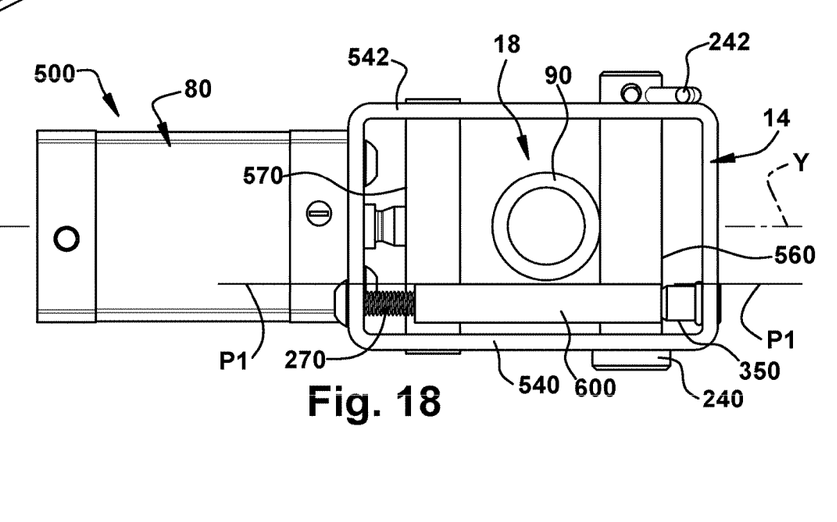
FIG. 18 is a front elevational view of the FIG. 17 pinch valve, showing the flexible tube resting on the guide rollers at the lower side of the flexible tube.

FIGS. 17 and 18 shows a pinch valve 500 according to another embodiment of the invention. The pinch valve 500 is in many respects similar to the above-referenced pinch valves 10, 400 and consequently the same reference numerals are used to denote structures corresponding to similar structures in the pinch valves 10, 400. In addition, the foregoing description of the pinch valves 10, 400 is equally applicable to the pinch valve 500 except as noted below. Moreover, it will be appreciated upon reading and understanding the specification that aspects of the pinch valves 10, 400, 500 may be substituted for one another or used in conjunction with one another where applicable.

The pinch valve 500 differs from the FIG. 1 pinch valve 10 in that the pinch valve 500 has only a front lower roller 600 and a rear lower roller (obstructed from view in FIGS. 17 and 18) and is oriented 90 degrees counterclockwise about the longitudinal axis X. Thus, the right pinch bar 560 and the left pinch bar 570 are spaced from one another in the direction perpendicular to the longitudinal axis X, and the actuator 80 is configured to linearly translate the left and right pinch bars 560, 570 relative to one another along the translation axis Y that is perpendicular to the longitudinal axis X to pinch the flexible tube 90 extending through the opening 18. Further, the lower front roller 600 and the lower rear roller are spaced from one another in the direction of the longitudinal axis X. The lower front roller 600 extends transverse the opening 18 and is positioned longitudinally upstream from the left and right pinch bars 560, 570. The lower rear roller extends transverse the opening 18 and is positioned longitudinally downstream from the left and right pinch bars 560, 570. The housing 14 includes the lower side wall 540 that borders the opening 18. The plane P1 lying tangent to the lower front roller 600 and the lower rear roller is spaced inward from the lower side wall 540 of the housing 14. In the FIGS. 17 and 18 embodiment, gravity keeps the flexible tube 90 resting on the lower front roller 600 and the lower rear roller. The lower front roller 600 and the lower rear roller guide and maintain the flexible tube 90 in spaced relation relative to the lower side wall 540. In this way, the lower rollers eliminate rubbing or wear of the flexible tube 90 due to contact with the lower side wall 540, not only during installation when the flexible tube 90 is fed through the pinch valve 500 but also during operation when the flexible tube 90 migrates laterally and longitudinally during compression between the right pinch bar 560 and the left pinch bar 570.

Figure 19:
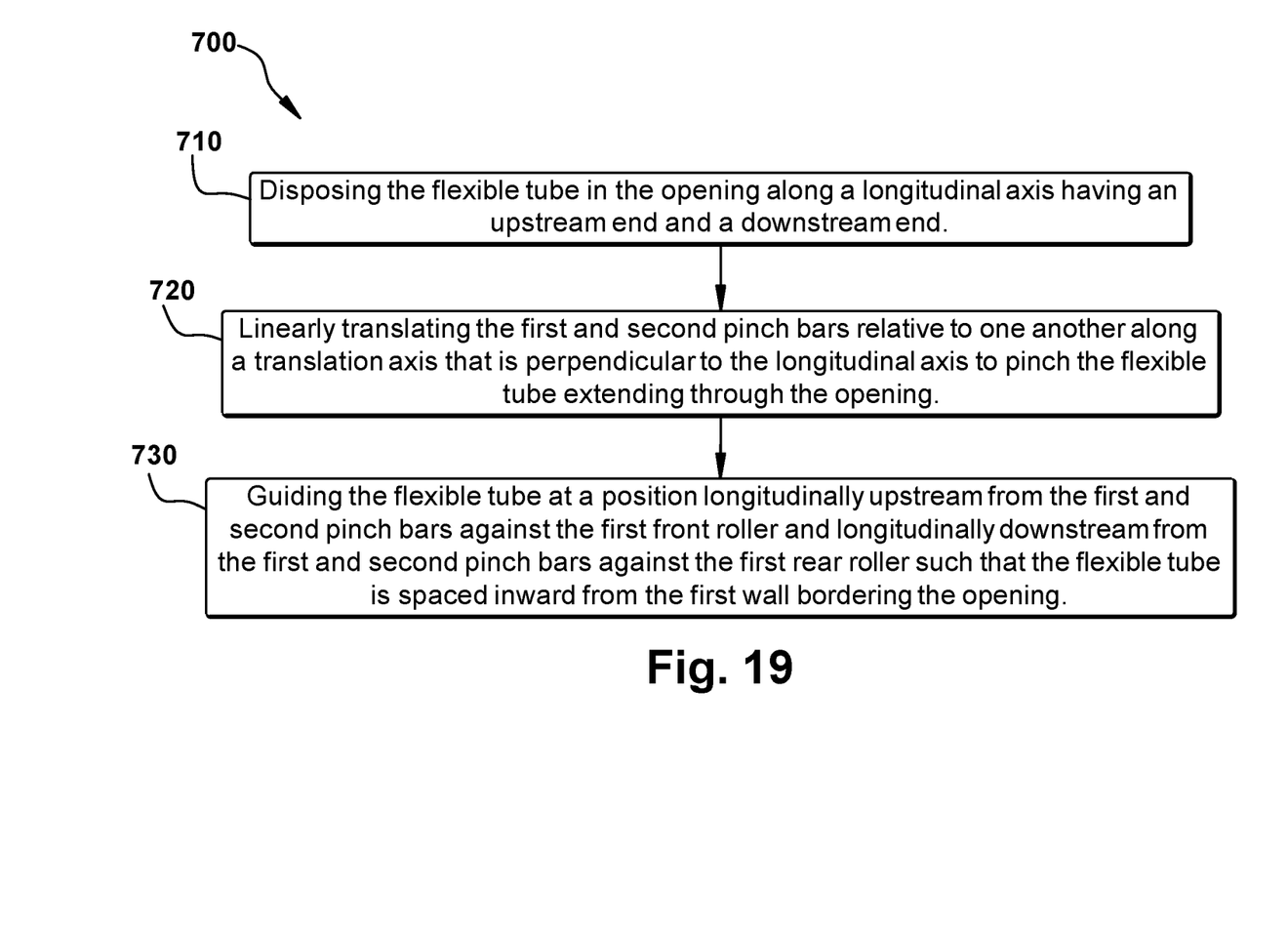
FIG. 19 shows a flowchart of a method in accordance with an embodiment of the invention.

Referring now to FIG. 19, a flowchart 700 is shown of a method of guiding a flexible tube in an opening of a pinch valve, such as the pinch valve 10. Thus, the pinch valve may include a housing including an opening extending therethrough and a first wall bordering the opening, a first pinch bar and a second pinch bar spaced from one another, an actuator configured to linearly translate the first and second pinch bars relative to one another, and a first front roller and a first rear roller spaced from one another. Step 710 of the method may include disposing the flexible tube in the opening along a longitudinal axis having an upstream end and a downstream end. Step 720 may include linearly translating the first and second pinch bars relative to one another along a translation axis that is perpendicular to the longitudinal axis to pinch the flexible tube extending through the opening. Step 730 may include guiding the flexible tube at a position longitudinally upstream from the first and second pinch bars against the first front roller and longitudinally downstream from the first and second pinch bars against the first rear roller such that the flexible tube is spaced inward from the first wall bordering the opening.

The housing may include a second wall bordering the opening, and the pinch valve may include a second front roller and a second rear roller spaced from one another, and another step of the method may include guiding the flexible tube at a position longitudinally upstream from the first and second pinch bars against the second front roller and longitudinally downstream from the first and second pinch bars against the second rear roller such that the flexible tube is spaced inward from the second wall bordering the opening.

The pinching of the flexible tube may include outwardly flexing and longitudinally flexing the flexible tube to urge the flexible tube against the first and second front rollers and against the first and second rear rollers.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A pinch valve, comprising:
 a housing including an opening extending therethrough along a longitudinal axis having an upstream end and a downstream end;
 a first pinch bar and a second pinch bar spaced from one another in a direction perpendicular to the longitudinal axis;

an actuator configured to linearly translate the first and second pinch bars relative to one another along a translation axis that is perpendicular to the longitudinal axis, the actuator being configured to linearly translate the first and second pinch bars relative to one another along the translation axis to pinch a flexible tube extending through the opening between a partially compressed state in which the flexible tube extending through the opening is partially compressed and a fully compressed state in which the flexible tube extending through the opening is fully compressed; and a first front roller and a first rear roller spaced from one another in the direction of the longitudinal axis, wherein the first front roller extends transverse the opening and is positioned longitudinally upstream from the first and second pinch bars and the first rear roller extends transverse the opening and is positioned longitudinally downstream from the first and second pinch bars;

wherein the housing includes a first wall bordering the opening, and wherein a first plane lying tangent to the first front roller and the first rear roller is spaced inward from the first wall of the housing.

2. The pinch valve of claim 1, wherein the first front roller and the first rear roller are configured to rotate about respectively a first front axis and a first rear axis that are perpendicular to the longitudinal axis.

3. The pinch valve of claim 2, wherein the first front axis and the first rear axis are parallel to the translation axis of the first and second pinch bars.

4. The pinch valve of claim 1, wherein the first and second pinch bars extend transverse the opening at respective first and second laterally opposite sides of the opening.

5. The pinch valve of claim 1, wherein the first pinch bar is a stationary pinch bar and the second pinch bar is a mobile pinch bar, and the actuator is configured to translate the mobile pinch bar toward the stationary pinch bar.

6. The pinch valve of claim 1, wherein the first and second pinch bars are round shape in axial cross section at least at portions of the first and second pinch bars that face one another.

7. The pinch valve of claim 1, wherein the first front roller and the first rear roller are configured to rotate about respective axes that are parallel to the translation axis of the first and second pinch bars.

8. The pinch valve of claim 1, further comprising a second front roller and a second rear roller spaced from one another in the direction of the longitudinal axis, wherein the second front roller extends transverse the opening and is positioned longitudinally upstream from the first and second pinch bars and the second rear roller extends transverse the opening and is positioned longitudinally downstream from the first and second pinch bars.

9. The pinch valve of claim 8, wherein the housing includes a second wall bordering the opening, and wherein a second plane lying tangent to the second front roller and the second rear roller is spaced inward from the second wall.

10. The pinch valve of claim 9, wherein the second plane and the first plane are at laterally opposite sides of the opening.

11. The pinch valve of claim 9, wherein the second plane is parallel to the first plane.

12. The pinch valve of claim 9, wherein the first and second walls border respective first and second laterally opposite sides of the opening.

13. The pinch valve of claim 8, wherein the first front roller and the second front roller are symmetrical about the longitudinal axis and symmetrical about the translation axis, wherein the first rear roller and the second rear roller are symmetrical about the longitudinal axis and symmetrical about the translation axis.

14. The pinch valve of claim 8, wherein the second front roller and the second rear roller are configured to rotate about respectively a second front axis and a second rear axis that are perpendicular to the longitudinal axis.

15. The pinch valve of claim 14, wherein the second front axis and the second rear axis are parallel to the translation axis of the first and second pinch bars.

16. The pinch valve of claim 8, wherein the first front roller and the second front roller are at laterally opposite sides of the opening, and the first rear roller and the second rear roller are at laterally opposite sides of the opening.

17. The pinch valve of claim 8, wherein the first front roller and the second front roller are positioned at respective laterally opposite sides of the opening at an equal distance from the center of the opening and the first rear roller and the second rear roller are positioned at the respective laterally opposite sides of the opening at an equal distance from the center of the opening.

18. A method of guiding a flexible tube in an opening of a pinch valve, wherein the pinch valve includes a housing including an opening extending therethrough and a first wall bordering the opening, a first pinch bar and a second pinch bar spaced from one another, an actuator configured to linearly translate the first and second pinch bars relative to one another, and a first front roller and a first rear roller spaced from one another, the method comprising:

disposing the flexible tube in the opening along a longitudinal axis having an upstream end and a downstream end;

actuating an actuator to linearly translate the first and second pinch bars relative to one another along a translation axis that is perpendicular to the longitudinal axis, the actuator being configured to linearly translate the first and second pinch bars relative to one another along the translation axis to pinch the flexible tube extending through the opening between a partially compressed state in which the flexible tube extending through the opening is partially compressed and a fully compressed state in which the flexible tube extending through the opening is fully compressed; and guiding the flexible tube at a position longitudinally upstream from the first and second pinch bars against the first front roller and longitudinally downstream from the first and second pinch bars against the first rear roller such that the flexible tube is spaced inward from the first wall bordering the opening.

19. The method of claim 18, wherein the housing includes a second wall bordering the opening, and the pinch valve includes a second front roller and a second rear roller spaced from one another, the method comprising guiding the flexible tube at a position longitudinally upstream from the first and second pinch bars against the second front roller and longitudinally downstream from the first and second pinch bars against the second rear roller such that the flexible tube is spaced inward from the second wall bordering the opening.

20. The method of claim 19, wherein pinching the flexible tube includes outwardly flexing and longitudinally flexing the flexible tube to urge the flexible tube against the first and second front rollers and against the first and second rear rollers.

* * * * *